(12) United States Patent
Heine

(10) Patent No.: US 6,421,919 B2
(45) Date of Patent: Jul. 23, 2002

(54) SETTING DEVICE

(75) Inventor: Werner Heine, Wigginsbach (DE)

(73) Assignee: Fa. Georg Kesel GmbH & Co. KG, Kempten (DE)

(*) Notice: Subject to any disclaimer, the term of this patent is extended or adjusted under 35 U.S.C. 154(b) by 0 days.

(21) Appl. No.: 09/725,695

(22) Filed: Nov. 29, 2000

(30) Foreign Application Priority Data

Dec. 10, 1999 (DE) .......................................... 199 59 458

(51) Int. Cl.$^7$ ............................................... B23D 63/04
(52) U.S. Cl. ................................................ 30/59; 30/58
(58) Field of Search .............................. 76/59, 66–68, 76/70, 58

(56) References Cited

U.S. PATENT DOCUMENTS 5,775,179 A * 7/1998 Haas ............................. 76/58

FOREIGN PATENT DOCUMENTS

FR        1042092     * 10/1953 ................. 76/66

* cited by examiner

Primary Examiner—Douglas D. Watts
(74) Attorney, Agent, or Firm—Notaro & Michalos P.C.

(57) ABSTRACT

The invention relates to a device for setting saw blades or belt-saw blades with clamping jaws arranged on both sides of the saw blade or belt-saw blade and with setting tools arranged on both sides and pivotable about an imaginary axis. It is the object of the invention to put forward a new device with which the setting result may be improved. According to the invention the object is achieved in that in horizontally displaceably mounted guiding blocks arranged on both sides of the saw blade or belt-saw blade there is pivotably mounted in each case a setting tool mounting formed as circle segment, wherein the guiding block is designed simultaneously as a clamping jaw for fixing the saw blade or belt-saw blade, and that displacement devices are provided for the horizontal displacement of the guiding blocks.

16 Claims, 2 Drawing Sheets

SETTING DEVICE

The invention relates to a device for setting saw blades or belt-saw blades with clamping jaws arranged on both sides of the saw blade or belt-saw blade and with setting tools arranged on both sides and pivotable about an imaginary axis.

Such a device is known from DE 195 17 482 A1.

With the known device the setting tools of both sides are held in each case in a basic position in which both setting tools bear without clamping on both sides of the saw blade and with their head surfaces facing the teeth enclose a head surface angle which is larger than or at the most equal to the setting angle enveloping the set teeth. From this it results that the setting tool may no longer be advanced in the direction of the saw blade for each setting procedure. The setting tools are held in the clamping-free position, wherein a slight contact by the saw blade and the head surfaces of the setting tools may arise with the travelling through of the saw blade. From the mentioned document it is also known to guide the setting tools on a circular pivoting path. The clamping jaws are with this operated hydraulically.

The known device has in practise the disadvantage that on account of the contact, even if small, of the setting tools with the saw blade on travelling through, there occur losses of sharpness, and material wear. Furthermore with the known design form there is the problem that belt-saw blade thickness fluctuations of the saw blade or belt-saw blade lead to a worsening of the setting result. On account of this in the mentioned document it is suggested to carry out a thickness detection of the saw blade and to compensate the fluctuations via electronics. This entails an enormous cost expense.

BRIEF SUMMARY OF THE INVENTION

It is the object of the present invention to put forward a new device with which the setting result may be improved.

This object is achieved with the initially mentioned device in that in horizontally displaceably mounted guiding blocks arranged on both sides of the saw blade or belt-saw blade there is pivotably mounted in each case a setting tool mounting formed as circle segment, wherein the guiding block is designed simultaneously as a clamping jaw for fixing the saw blade or belt-saw blade, and that displacement devices are provided for the horizontal displacement of the guiding blocks.

After each setting procedure the setting tool mountings and the setting tools fastened thereto in the setting tool bearing are pivoted on a part circular path. With this there is actuated a displacement mechanism which moves the guiding blocks outwards. Since the guiding blocks simultaneously serve as clamping jaws for fixing the saw blade or belt-saw blade with the setting procedure, these release the saw blade or belt-saw blade. The saw blade or belt-saw blade then without contacting the clamping jaws or the setting tool, may be transported further.

This manner of design may be observed as a floating mounting of the whole system. With this the great advantage is that the thickness fluctuations of the saw blade or belt-saw blade are automatically compensated since the saw blade is always exactly centrically fixed. This is possible since the setting tool mountings with the setting tools and the guiding blocks serving simultaneously as clamping jaws form one unit. By way of the horizontal displaceability of the guiding blocks each change in thickness is automatically compensated. From this it results that one may do away with a electronic thickness measurement and the evaluation and compensation electronics which this entails. This saves costs and makes the whole device more robust and less prone to breakdown;

A further enormous advantage lies in the fact that one may completely do away with pneumatic or hydraulic devices. The design expense is by way of this considerably reduced, maintenance costs too are reduced by way of this and the maintenance intervals are lengthened. The application of pneumatic or hydraulic devices with the setting of saw blades or belt-saw blades is therefore also problematic since these devices in comparison to purely mechanical devices have a higher inertia.

According to a further embodiment form of the invention the setting tool bearing is designed as a sliding bearing. Sliding bearings are very low-maintenance and offer a high guiding accuracy of the setting tool mounting, this accuracy being compellingly necessary for an exact setting process.

A particularly, advantageous further formation of the invention envisages that at least one guiding block, preferably both guiding blocks are traversable outwards by way of a displacement device which is releasable on pivoting the setting tool mounting out of the setting position so that the saw blade is released from the clamping jaws. By way of linking these procedures the accuracy of the setting procedure is increased even further. Thus without a great control expense it is possible to move the guiding blocks to the outside when the setting tools move away from the setting position. The point in time at which this is effected is on account of the lining always equal. The saw blade or belt-saw blade is released and may then be transported further.

According to a particularly advantageous embodiment form of this displacement device it is envisaged that in each case at least one shaft rotatable mounted in each guiding block, with a radially protruding lug via at least one carrier pin on the setting tool mounting is actuatable on pivoting the setting tool mounting out of the setting position, and that this shaft is coupled to at least one rod fastened in the housing block such that the guiding block on actuation of the shaft is moved outwards. If the setting tool mounting is pivoted out of the setting position a carrier pin fastened to this setting tool mounting or connected to this with a non-positive fit, engages into a lug projecting radially from a shaft. By way of further pivoting of the setting tool mounting downwards, the carrier pin by way of pressing down the lug "forces" the shaft into a rotational movement. Since the shaft is coupled to at least one rod fastened in the housing, this rotational movement is converted into a horizontal movement of the guiding blocks to the outside. The coupling may for example be effected via pinions or rods. This very effective manner of construction permits absolute precision and avoids the application of expensive control electronics.

According to a further very advantageous further formation of the invention the carrier pin is connected to the setting tool mounting with a non-positive fit. The setting tool mounting and carrier pin must therefore not be manufactured as one component. The manufacture is simplified. Furthermore there result further design possibilities, e.g. the coupling of the carrier pin to the drive unit.

So that the guiding blocks after the displacement to the outside may again be uniformly displaced into a central setting and fixing position, at least one guiding block, preferably both guiding blocks after unloading the displacement device, by way of a leading-back device are displaced in the direction of the saw blade or belt-saw blade. By way of this it is achieved that the saw blade or belt-saw blade after the further transport is again fixed and may be set.

According to a further very advantageous embodiment form of the invention the leading-back device consists of a disk spring assembly. This disk spring assembly is preferably mounted between the housing and the guiding block. If the guiding block is moved outwards by pivoting the setting tool mounting, this is effected against the spring force of the disk spring assembly. If the displacement device is unloaded, i.e. the carrier pin again moves away from the lug and releases this, the guiding blocks are moved away from the housing in the direction of the saw blade or belt-saw blade. This very simply designed leading-back device is very efficient, inexpensive and maintenance-free. Furthermore it is ensured that both guiding blocks are displaced in the direction of the saw blade or belt-saw blade with the same force.

The setting result is particularly precise when the setting movement is effected in opposite directions, preferably simultanously. Particularly the torsion moments arising with the setting process may thus be compensated. The setting is effected more accuately and damage to the saw blade or belt-saw blade is ruled out.

A particularly advantageous embodiment form of the invention envisages that the setting tools are exchangeable on the setting tool mounting formed as a circle segment. Damaged tools may thus be quickly and simply exchanged. Also the adjustment to another product may be effected more quickly.

According to a further advantageous further formation the drive of the setting tool mounting and thus of the clamping jaws and of the setting tool is effected via at least one servo-motor. Servo-motors may be precisely activated and have very short reaction times. If required the drive however may also be effected via hydraulic, pneumatic or other drive devices.

A particularly advantageous embodiment form of the invention envisages that the drive and setting tool mounting are connected to one another via a ball rod. This simple design manner offers a direct force transmission and is not prone to breakdown.

With a further embodiment form it is advantageously envisaged that the setting tool mountings are traversable via spur wheel drives. Also with this it is the case of a very reliable manner of force transmission.

Also the embodiment form with which the setting tool mountings are traversable via a worm drive is advantageous. Here one may vary according to the drive unit.

According to a further advantageous embodiment form the setting tool mountings are servo-hydraulically traversable. This may be advantageous in the case that the force for setting coarse teeth may not be economically realized by way of electro-mechanical drives.

BRIEF DESCRIPTION OF THE DRAWINGS

In the following the invention is explained in more detail by way of embodiment examples. There are shown in FIG. 1 a setting device according to the invention in a front view, partly sectioned and FIG. 2 a setting device according to the invention in a plan view, partly sectioned.

DETAILED DESCRIPTION OF THE INVENTION

Figure 1:
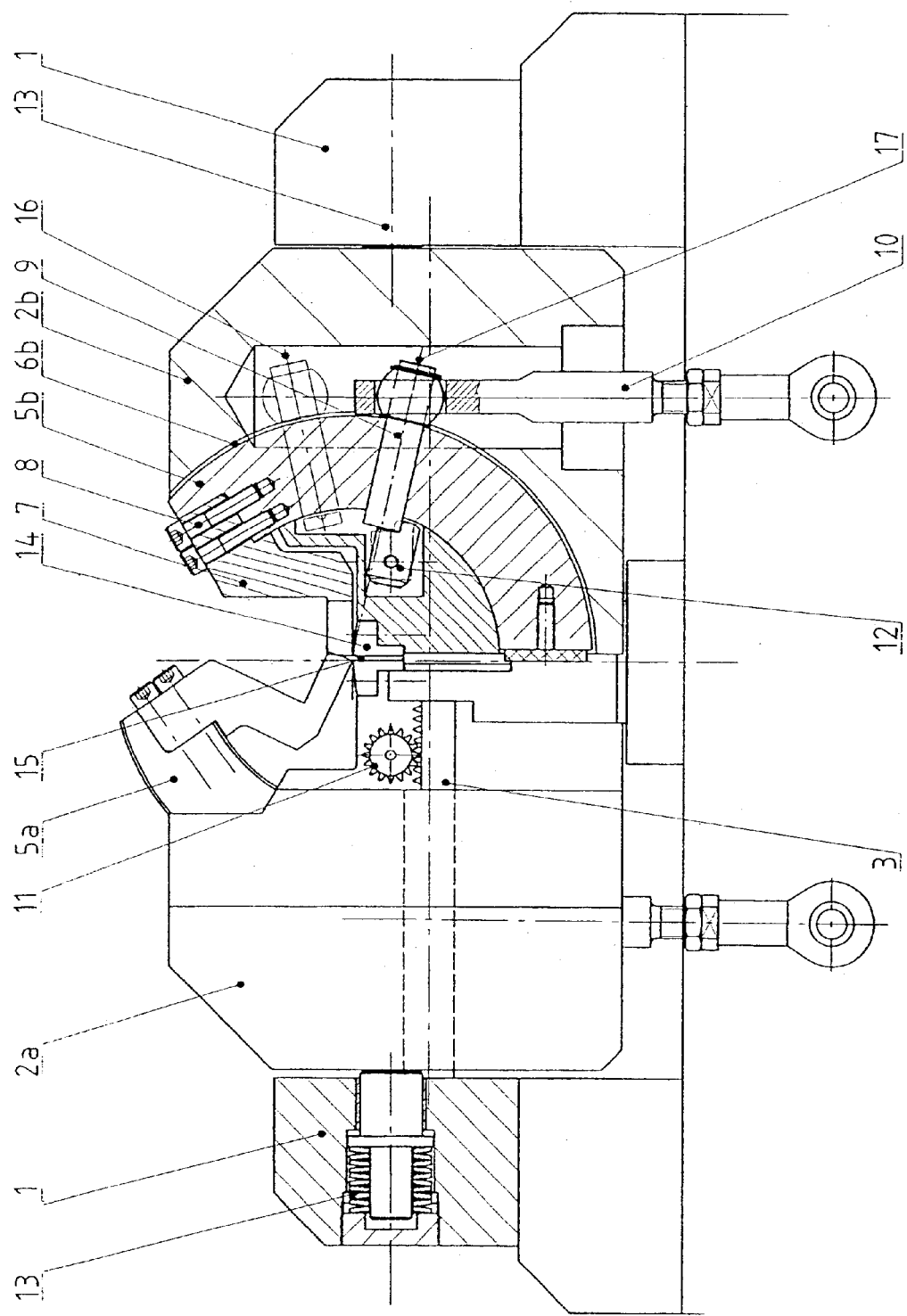
Figure 2:
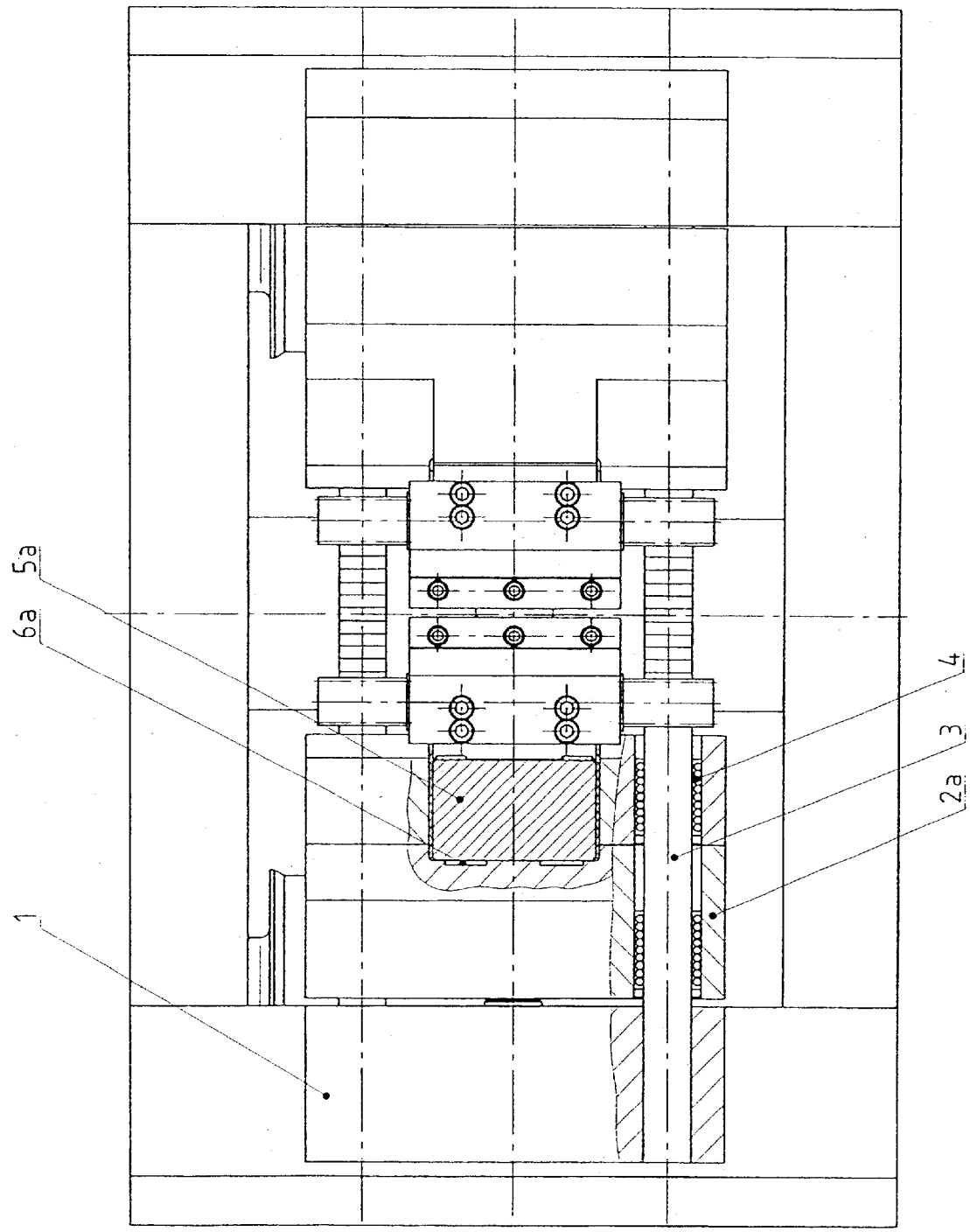

In a housing 1 two guiding blocks 2a, 2b are mounted horizontally displaceable on two rods 3 fastened in the housing 1. The bearing in this concrete embodiment example is designed as a rolling bearing 4. In the guiding blocks 2a, 2b in each case a setting tool mounting 5a, 5b is pivotably mounted. The setting tool beatings 6a, 6b are designed as sliding bearings. At the upper end of the setting tool mountings 5a, 5b the setting tools 7 are screwed on with two screws 8. The setting tool mountings 5a, 5b are in each case passed through by a carrier pin 9. This carrier pin 9 is a constituent part of the ball rod 10 which connects the drives and the setting tool mountings 5a, 5b. In both guiding blocks in each case a shaft 11 is rotatably mounted. On each shaft there is attached a radially projecting lug 12. The shafts 11 are via a pinion connected to two rods 3. The rods 3 are fastened on the housing side walls. In the housing 1 there are admitted disk spring assemblies 13. The spring force is contained on the one hand by the housing, and on the other hand by the guiding blocks 2a, 2b. The guiding blocks 2a, 2b are designed as clamping jaws 14. Running through their middle in a straight line is the saw blade or belt-saw blade 15.

If the setting tools 7 with the setting tool mountings 5a 5b are located in the setting position 16 then the saw blade or belt-saw blade 15 is fixed by way of the clamping jaws. If now the drive moves the ball rod 10 downwards the setting tool mountings 5a, 5b via the carrier pin 9 are likewise moved downwards. The setting tools 7 move away from the saw blade or belt-saw blade. From a certain position the carrier pin engages into the lug 12 fastened on the shaft 11. This is likewise co-moved and the shaft 11 is forced into rotation. Since the shaft 11 by way of pinions is connected to the rods 3 a movement of the guiding blocks 2a, 2b to the outside occurs. Since the guiding blocks 2a, 2b simultaneously serve as clamping jaws the saw blade or belt-saw blade 15 is released and may now be transported further. The movement to the outside is effected against the spring force of the disk spring assemblies 13. If the direction of the drive is reversed the setting tool mounting moves out of the passive position 17 again in the direction of the setting position 16. The lug 12 and thus the shaft 11 are unloaded. The spring force of the disk spring assemblies 13 the displaces the guiding blocks 2a, 2b with all the setting tool mountings 5a, 5b in the direction of the saw blade 15. The saw blade is again centrically fixed between the clamping jaws 14.

What is claimed is:

1. A device for setting saw or belt-saw blades, comprising:
   housing;
   a pair of guiding blocks mounted to the housing;
   a clamping jaw connected to each guiding block, the clamping jaws having a setting position for clamping a blade to be set;
   at least one of the guiding blocks being mounted for movement to the housing, for moving the clamping jaw connected to the at least one guiding block to release the blade;
   a setting tool mounting mounted to each guiding block, for rotation about a circle segment;
   a setting tool connected to each setting tool mounting, for setting a blade clamped between the clamping jaws; and
   displacement means for displacing the at least one of the guiding blocks for moving the clamping jaw connected to the at least one guiding block to release the blade.

2. A device according to claim 1, including a sliding bearing engaged between each setting tool mounting and the guiding block to which the setting tool mounting is mounted for rotation of each setting tool mounting.

3. A device according to claim 1, wherein the displacement means are operatively connected to at least one of the setting tool mountings so that rotation of the at least one of the setting tool mountings moves the clamping jaws out of the setting position to release the blade.

4. A device according to claim 3, wherein both of the guiding blocks are mounted for movement to the housing, for moving both clamping jaws away from the setting position to release the blade, the displacement means being operatively connected each of the setting tool mountings so that rotation of each setting tool mounting moves the clamping jaws out of the setting position to release the blade.

5. A device according to claim 3, including at least one rod connected to the housing, the at least one guiding block being mounted for movement to the at least one rod, the displacement means including a carrier pin in the setting tool mounting which is mounted to the at least one guiding block and a shaft with a radially protruding lug, the shaft being mounted for rotation to the guiding block and being operatively engaged to the at least one rod so that movement of the carrier pin caused rotation of the setting tool mounting and engagement of the carrier pin with the lug to rotate the shaft and move the at least one guiding block away from the setting position.

6. A device according to claim 5, wherein the carrier pin is connected to the setting tool mounting with a non-positive fit.

7. A device according to claim 1, including biasing means for moving the at least one guiding block back to the setting position.

8. A device according to claim 7, wherein the biasing means comprises a disk spring assembly.

9. A device according to claim 1, wherein both guiding blocks are mounted for movement to the housing, for moving both clamping jaws to the setting position to clamp the blade and away form the setting position to release the blade, the displacement means displacing the guiding blocks in opposite directions.

10. A device according to claim 9, wherein the displacement means displaces the guiding blocks in opposite directions simultaneously.

11. A device according to claim 1, wherein the setting tools are exchangeable on the setting tool mountings.

12. A device according to claim 1, wherein the displacement means includes a servomotor for displacing the at least one guiding block.

13. A device according to claim 1, wherein the displacement means are operatively connected to at least one of the setting tool mountings so that rotation of the at least one of the setting tool mountings moves the clamping jaws out of the setting position to release the blade, the displacement means including a ball rod engaged to the setting tool mounting.

14. A device according to claim 1, wherein the displacement means are operatively connected to at least one of the setting tool mountings so that rotation of the at least one of the setting tool mountings moves the clamping jaws out of the setting position to release the blade, the displacement means including a spur wheel drive.

15. A device according to claim 1, wherein the displacement means are operatively connected to at least one of the setting tool mountings so that rotation of the at least one of the setting tool mountings moves the clamping jaws out of the setting position to release the blade, the displacement means including a worm gear drive.

16. A device according to claim 1, wherein the displacement means are operatively connected to at least one of the setting tool mountings so that rotation of the at least one of the setting tool mountings moves the clamping jaws out of the setting position to release the blade, the displacement means including means for hydraulically moving the setting tool mounting.

* * * * *